(12) United States Patent
Fuse et al.

(10) Patent No.: US 7,597,404 B2
(45) Date of Patent: Oct. 6, 2009

(54) TUBELESS TIRE WHEEL

(75) Inventors: Tomohiro Fuse, Wako (JP); Kazuhiko Gogo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/135,953

(22) Filed: May 24, 2005

(65) Prior Publication Data

US 2005/0269867 A1  Dec. 8, 2005

(30) Foreign Application Priority Data

Jun. 8, 2004 (JP) ............................. 2004-169586

(51) Int. Cl.
*B60B 1/04* (2006.01)
*B60B 21/06* (2006.01)

(52) U.S. Cl. ............. 301/58; 301/67; 301/95.106; 301/104

(58) Field of Classification Search .............. 301/67, 301/68, 69, 70, 73, 79, 55, 58, 104, 95.104, 301/95.106, 95.107, 95.108
See application file for complete search history.

(56) References Cited

U.S. PATENT DOCUMENTS

| | | | | |
|---|---|---|---|---|
| 382,658 A | * | 5/1888 | Nickerson | 301/95.105 |
| 579,260 A | * | 3/1897 | Dobrowolski et al. | 301/69 |
| 599,271 A | * | 2/1898 | Tucker | 301/69 |
| 604,726 A | * | 5/1898 | Chambliss | 301/69 |
| 734,588 A | * | 7/1903 | Miller | 301/56 |
| 1,004,988 A | * | 10/1911 | Callan | 152/63 |
| 1,676,303 A | * | 7/1928 | Wagenhorst | 301/95.106 |
| 2,977,153 A | * | 3/1961 | Mueller | 301/95.107 |
| 4,398,770 A | * | 8/1983 | Smith | 301/37.29 |
| 4,626,036 A | * | 12/1986 | Hinsberg et al. | 301/58 |
| 4,693,520 A | * | 9/1987 | Brown | 301/37.29 |
| 5,499,864 A | * | 3/1996 | Klein et al. | 301/95.104 |
| 5,882,088 A | * | 3/1999 | Yahata | 301/110.5 |
| 6,145,936 A | * | 11/2000 | Alberti et al. | 301/58 |
| 6,145,937 A | * | 11/2000 | Chen | 301/58 |
| 6,155,651 A | * | 12/2000 | Mizata et al. | 301/95.104 |
| 6,189,978 B1 | * | 2/2001 | Lacombe et al. | 301/104 |
| 6,367,883 B1 | * | 4/2002 | Chen | 301/55 |
| 6,378,953 B2 | * | 4/2002 | Mercat et al. | 301/95.106 |
| 2004/0004391 A1 | * | 1/2004 | Fioravanti | 301/95.104 |
| 2005/0242658 A1 | * | 11/2005 | Carlson et al. | 301/58 |

FOREIGN PATENT DOCUMENTS

FR  2635295  *  2/1990

(Continued)

OTHER PUBLICATIONS

Official Action issued by the Japanese Patent Office Jan. 14, 2009.

*Primary Examiner*—Russell D Stormer
(74) *Attorney, Agent, or Firm*—Hamre, Schumann, Mueller & Larson, P.C.

(57) ABSTRACT

A tubeless-tire spoke wheel with spokes threaded directly into integral bores of the wheel rim. The integral bores have closed ends which allow for a large degree of tubeless-tire design flexibility while also providing enhanced strength characteristics. This results in stiffer, stronger designs while providing for lighter, more energy efficient wheels.

7 Claims, 10 Drawing Sheets

FOREIGN PATENT DOCUMENTS

| | | | |
|---|---|---|---|
| JP | 60-12315 | * | 1/1985 |
| JP | 60-94801 | * | 5/1985 |
| JP | 62-48802 U | | 3/1987 |
| JP | 1-160701 | * | 6/1989 |
| JP | 3065990 U | | 11/1999 |
| JP | 2000-6601 | | 1/2000 |
| JP | 2002-234301 A | | 8/2002 |
| WO | WO 93/09963 | * | 5/1993 |

* cited by examiner

TUBELESS TIRE WHEEL

FIELD OF THE INVENTION

The present invention relates to an improvement of a wheel for a tubeless tire which does not include a tube.

BACKGROUND OF THE INVENTION

For a motorcycle, combinations have heretofore been adopted in which a tubeless tire is fitted to a cast wheel, and a tube tire containing a tube inside is fitted to a spoke wheel. This is because of a structural reason, that is, since spokes penetrate a rim, there is difficulty in using the tubeless tire.

However, a spoke wheel to which a tubeless tire can be fitted has been proposed in Japanese Patent Laid-Open No. 2000-6601, the spoke wheel having the aim of combining the advantages of a tubeless tire and the advantages of a spoke wheel. FIG. 2 of Japanese Patent Laid-Open No. 2000-6601 is a cross section along the radial direction of a conventional tubeless-tire spoke wheel. A plurality of spokes 30 (with regard to reference numerals, ones used in the publication are used hereinbelow) which are attached to a hub, which is at the center of the wheel, in a state where the spokes are outwardly directed from the hub, are attached to a rim 11, and a tire T is fitted to the rim 11.

The rim 11 includes a pair of tubular hollow portions 12 and 13 integrally, and the tubular hollow portions 12 and 13 are disposed between a plane P at the middle of the wheel and flanges 24 and 25, respectively, the flanges supporting a bead portion of the tire T.

In addition, an end of the spoke 30 is attached to a seat portion 33 in the rim 11 via a fastening nipple 31. This is one in which through holes, through which spokes 30 are passed, are made in the seat portions 32 and 33 along outer walls 22 and 23 of the tubular hollow portions 12 and 13.

However, since, as is apparent from FIG. 2, the seat portions 32 and 33 have to be disposed more outward than the flanges 24 and 25, the positions of the seat portions 32 and 33 are limited, and thus, it has been difficult to freely select the attachment position of the spoke 30. That is, the degree of flexibility in the design for the attachment position of the spoke is small.

Therefore, an object of the present invention is to provide a tubeless-tire spoke wheel capable of increasing the degree of flexibility in the design for the attachment positions of spokes.

SUMMARY OF THE INVENTION

A tubeless-tire wheel is provided which includes a hub attached to an axle, a rim to which a tubeless tire is fitted, and a plurality of spokes connecting the rim to the hub, the tubeless-tire wheel comprising an external thread portion formed in an end portion of the spoke on the rim side; an internal thread portion into which the external thread portion can be screwed formed in the rim and one end of the spoke connected to the rim by screwing the external thread portion into the internal thread portion.

In a conventional nipple structure, it is necessary to provide a through hole to a rim. Therefore, the attachment position of the spoke is limited to each edge of the rim, and the degree of flexibility in the design will be small.

In this respect, the internal thread portion may be formed in the rim, and it is possible to provide the internal thread portion to an arbitrary position in the rim. As a result, it is possible to increase the degree of flexibility in the design for the attachment position of the spoke.

Further, the rim may include a bottom portion, inclined portions obliquely extended from the bottom portion, and base portions flatly, outwardly extended from outer edges of these inclined portions and the internal thread portion formed in the inclined portion.

An internal thread portion formed in the inclined portion which is provided between the bottom portion and the base portion also serves as a strengthening part.

The internal thread portion may be formed in any of the bottom portion, the inclined portion, and the base portion of the rim. Among them, while the bottom portion and the base portion are substantially orthogonal to the spoke, it is possible to make the inclined portion be in line with the spoke. If the internal thread portion is formed in such an inclined portion, it is possible to form the internal thread portion with a sufficient length, and it is not necessary to increase the thickness of the inclined portion so much.

That is, it is possible to form a sufficient length of screw hole in the inclined portion which has relatively thin thickness. As a result, there is an advantage that it is possible to achieve reduction in the weight of the rim.

The spoke may be inclined parallel to the inclined portion of the rim. Since the spoke may be inclined parallel to the inclined portion, it is possible to make the internal thread for fastening the spoke by use of the thickness of the inclined portion.

If the inclination of the inclined portion and the inclination of the spoke coincide with each other, it is possible to further reduce the thickness of the inclined portion, and an advantage that it is possible to achieve further reduction in the weight of the rim can be brought about.

The thickness of the inclined portion may be set thicker than those of the adjacent bottom portion and base portion. Since the thickness of the inclined portion may be thicker than those of the bottom portion and the base portion, it is possible to inhibit the local deformation of the inclined portion which is the part on which force is exerted. At the same time, since it is possible to make the adjacent bottom portion and base portion thin, it is possible to achieve reduction in the weight of the rim.

In the inclined portion, a part to which the internal thread portion is provided may be made thick, and the other part may be set thin to the extent that the thickness thereof is substantially equal to those of the bottom portion and the base portion.

If the inclined portion were made evenly thick, the weight of the rim would increase. Accordingly, the needed portion (part to which the internal thread portion is provided) in the inclined portion can be made thick, and the other part thereof can be made thin to the extent that the thickness thereof is substantially equal to those of the bottom portion and the base portion, thereby reducing the unnecessary thickness, and thus an advantage that reduction in the weight of the rim can be achieved can be brought about.

The tubeless tire wheel may further comprise an inner circumference of a tire brought into contact with the base portion and the extension of the spoke disposed to run along a side portion of the tire. Since an inner circumference of a tire is brought into contact with the base portion, and the extension of the spoke can be disposed to run along a side portion of the tire, there is no need to arrange the spoke unnecessarily widely, so that a compact structure can be realized. In addition, there is an advantage that the load exerted from the spoke can be effectively received by the tire which runs along the extension of the axis of the spoke.

The rim of the tubeless tire wheel may include a bottom portion in the middle thereof in the width direction of the cross section, a protruding portion protruding in the direction away from the hub provided to the bottom portion, and the internal thread portion formed in the protruding portion. Thus, it is possible to dispose the heavy portion at the rotation center. As a result, an advantage that the cornering ability of the wheel can be improved can be brought about.

Further, the rim may include a bottom portion, inclined portions obliquely extended from the bottom portion, base portions flatly, outwardly extended from outer edges of these inclined portions, and flanges extended from outer edges of these base portions in the direction away from the hub and the internal thread portion formed in the flange. Since the internal thread portion is formed in the flange, and the flange is formed thick for connection with the spoke, it is possible to increase stiffness. The flange becomes resistant to deformation, and, even when the flange receives impact force from the outside, air leak can be reduced.

The rim may be made as a hollow-cross-section structure including a hollow portion and the internal thread portion formed in a wall portion surrounding the hollow portion. Since the rim is made as a hollow-cross-section structure including a hollow portion, it is possible to reduce the weight of the rim. In addition, by forming the internal thread portion in a wall portion surrounding the hollow portion, and devising the cross sectional shape of the hollow portion, an advantage can be brought about that it is made possible to easily increase the section modulus, and to achieve increase in the stiffness of the wheel.

DETAILED DESCRIPTION OF THE INVENTION

Figure 1:
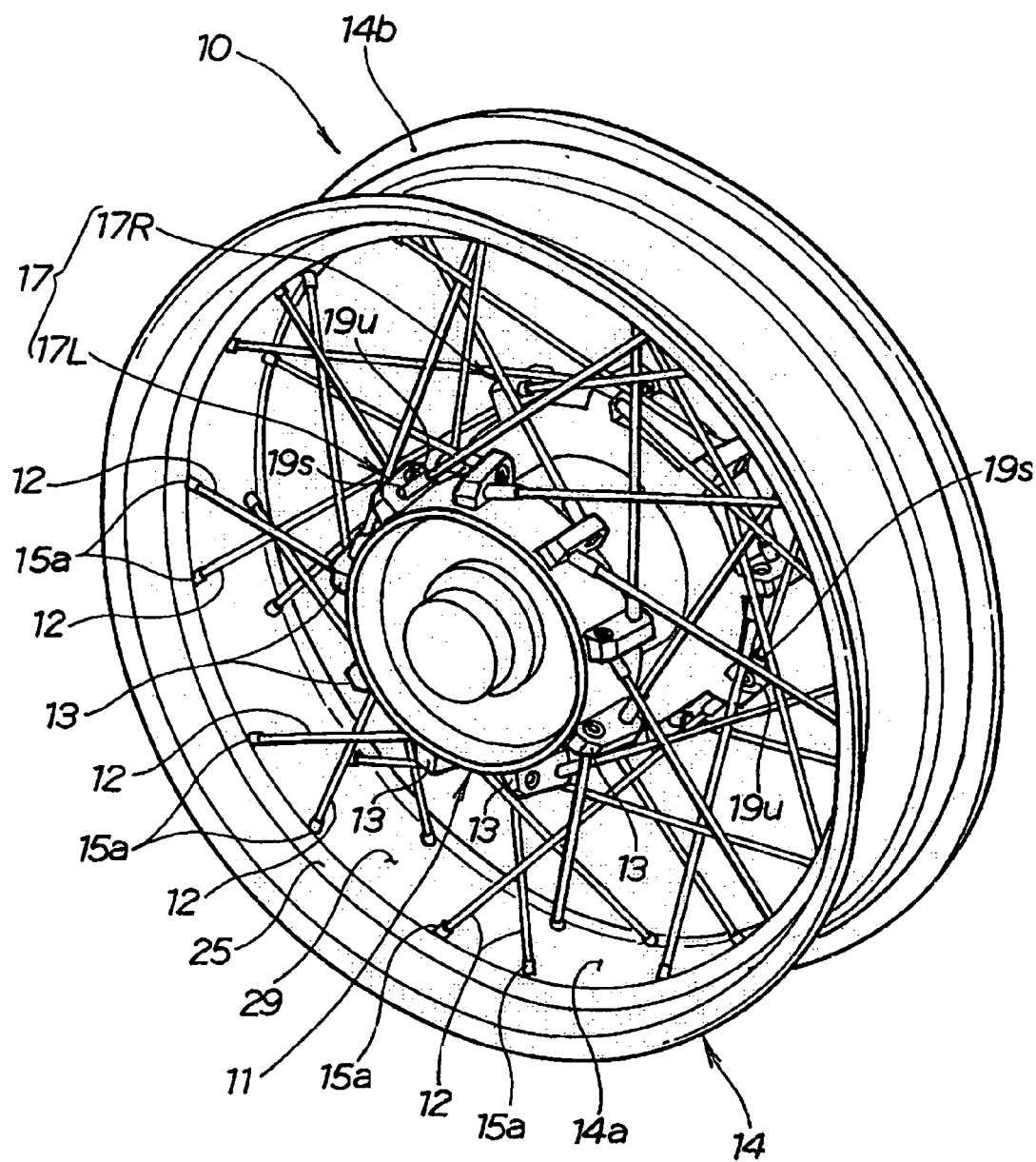
FIG. 1 is a perspective view of a tubeless-tire wheel according to a first embodiment.

FIG. 1 is a perspective view of a tubeless-tire wheel according to a first embodiment. The tubeless-tire wheel 10 is provided with a plurality of holder portions 13 . . . (hereinafter, " . . . " indicates plurality) for attaching spokes 12 . . . around a hub 11 which is at the center of the wheel. The spokes 12 . . . are extended from the holder portions 13 . . . toward the inner circumferential face 14a of a circular-wheel-shaped rim 14. One ends 15a . . . of the spokes 12 . . . are attached to the inner circumferential face 14a of the rim.

Moreover, a tubeless tire is fitted onto the outer circumferential face 14b of the rim 14.

In other words, the tubeless-tire wheel 10 is a member which includes the hub 11 for attachment to an axle, the rim 14 onto which the tubeless tire is fitted, and the plurality of spokes 12 . . . for connecting the rim 14 and the hub 11.

The holder portions 13 . . . have two rows of holders 17 in the axis direction of the hub 11. The rows of holders 17 consist of a left side row 17L and a right side row 17R. Moreover, the holder portions 13 . . . constituting the rows of holders 17 include two hole portions 19s . . . and 19u . . . constituted of the outer ones and the inner ones, respectively.

The spokes 12 . . . attached around the hub 11 are members which are arranged in a state where a plurality of types of attachment directions are given to the spokes 12.

Forces of at least three kinds of directions are exerted on the spokes 12 . . . , the forces being exerted, for example, when a vehicle is at rest, when a driving force is applied to the wheel, and when a braking force is applied to the rotating wheel. Since the other irregular forces due to the influences of the road surface irregularities and the like are additionally exerted on the wheel 10, a function of supporting the forces exerted from various directions is required of the wheel 10.

For supporting these forces effectively, the plurality of spokes 12 . . . extended toward the inner circumferential face 14a of the rim 14 are attached with a plurality of types of attachment directions given thereto.

Figure 2:
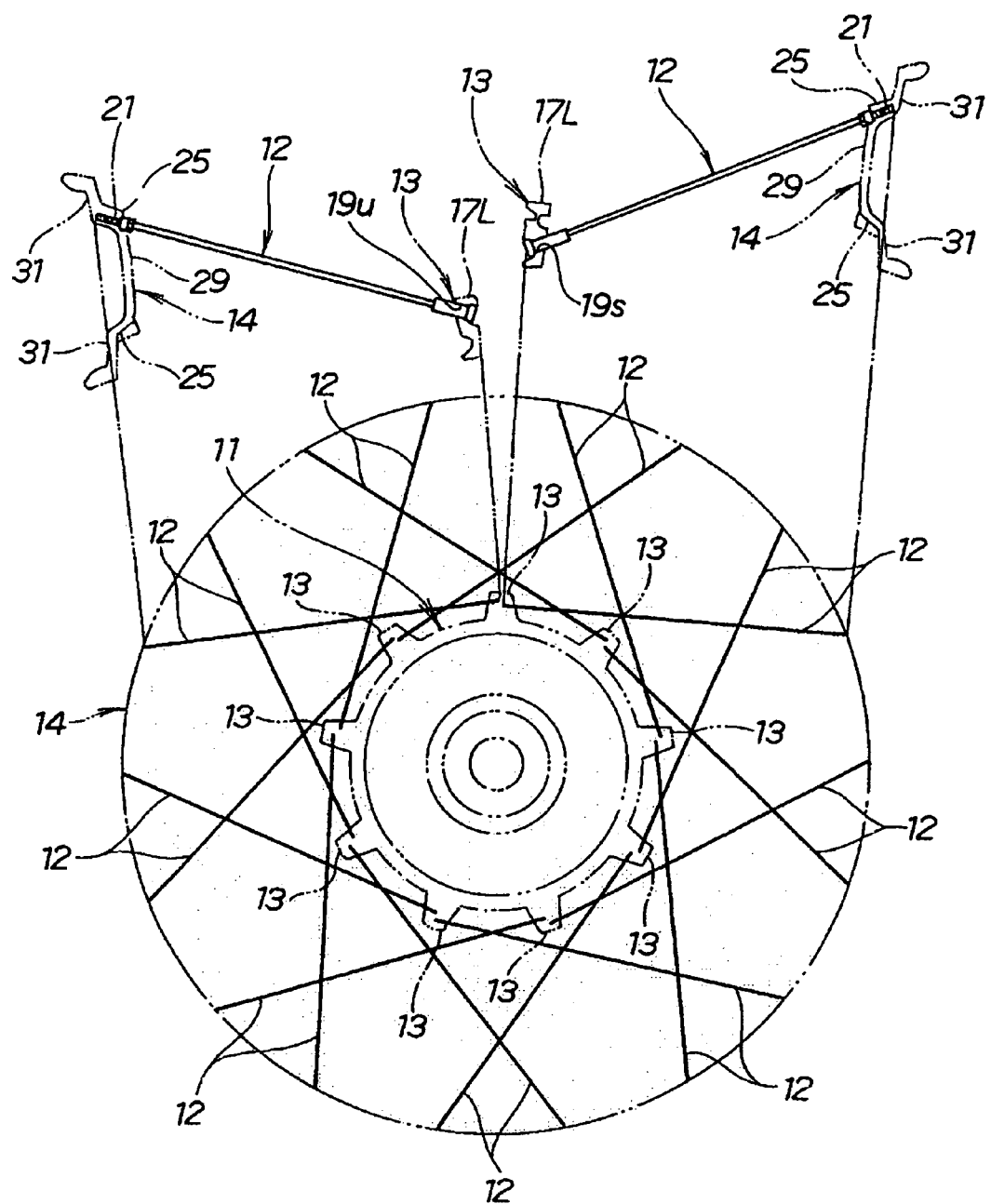
FIG. 2 is a diagram for explaining a state of spokes attached to the wheel according to the first embodiment.

FIG. 2 is a diagram for explaining a state of the spokes attached to the wheel according to the first embodiment, and shows the relative arrangement of the spokes 12 . . . .

As attachment portions of the spokes 12 . . . , there are the hole portions 19s . . . and 19u . . . which the holder portions 13 . . . constituting the left side row 17L in the hub 11 have, and internal thread portions 21 . . . made in the rim 14. Moreover, the spokes 12 . . . are extended from the hole portions 19s . . . and 19u . . . of the holder portions 13 . . . to the rim 14, and attached thereto.

In FIG. 2, shown is the arrangement of the spokes 12 . . . extended from the holder portions 13 . . . of the left side row 17L out of two rows of holders 17L and 17R included in the hub 11. The spokes extended from the right side row 17R are the same as those extended from the left side row 17L with the exception that the spokes extended from the right side row 17R are arranged with a some phase difference between 1° and 15° given thereto with respect to the spokes of the left side row 17L, and therefore will be omitted.

Next, by taking as an example one holder portion 13 out of the holder portions 13 . . . arranged in the left side row 17L, a description concerning attachment relation at the start and end points of the two spokes 12, 12 extended from the holder portion 13 will be given.

The upper left part of FIG. 2 is a diagram showing that the spoke 12 is extended from the inner hole 19u included in the holder portion 13 to an inclined portion 25 disposed in the inner side of the rim 14, and attached thereto.

On the other hand, the upper right part of FIG. 2 is a diagram showing that the spoke 12 is extended from the outer hole 19s in the holder portion 13 to the inclined portion 25 disposed in the inner side of the rim 14, and attached thereto.

Thus, in the present embodiment, each spoke 12, which protrudes from the holder portion 13 included in the left side row 17L, is extended to the inclined portion 25 provided in the inner side of the rim 14, and attached thereto.

Similarly, each spoke 12, which protrudes from the holder portion 13 included in the right side row 17R (not shown), is extended to the inclined portion 25 provided to the outer side of the rim 14, and attached thereto.

Figure 3:
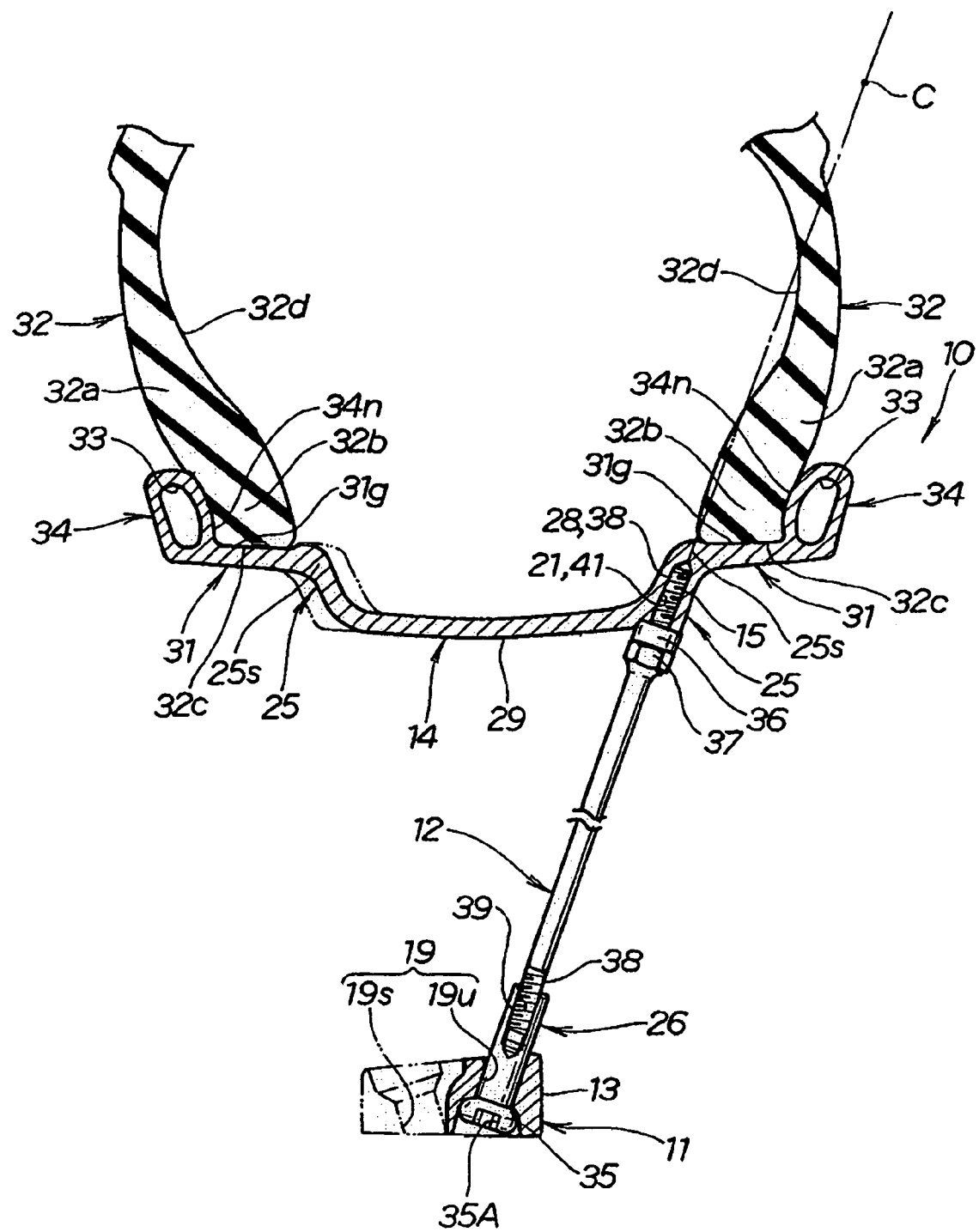
FIG. 3 is a main-part cross section of FIG. 2.

FIG. 3 is a main-part cross section of FIG. 2, showing the attachment structure of the spoke on the hub side and the rim side.

The spoke 12 is a member which engages with the hole portion 19 included in the holder portion 13 of the hub 11 via an adjustment member 26 and, in a state where the internal thread portion 21 is made in the inclined portion 25 included in the rim 14, which is attached to the rim 14 by screwing an external thread portion 28 of the spoke 12 into the internal thread portion 21.

The rim 14 includes a bottom portion 29, the inclined portions 25, 25, which are inclined toward a tire from the bottom portion 29, base portions 31, 31, which are extended from these inclined portions 25, 25 to the outside, and flanges 34, 34 which include hollow portions 33, 33 and are extended from the base portions 31, 31 toward the tire 32. The tire 32 is fitted in a state where bead portions 32b, 32b of the tire 32 is abutted against outer surfaces 31g, 31g of the base portions 31, 31 and inner surfaces 34n, 34n of the flanges 34, 34. Incidentally, 32a is a tire side portion.

With regard to the portions of the spoke 12, 36 indicates a collar portion; 37, a fastening portion; and 38, an external thread portion which also serves as an end portion on the rim side.

The fastening portion 37 to which to apply a tool when the spoke 12 is screwed into the rim 14 is provided. Reference numeral 26 indicates the adjustment member provided separately from the spoke 12. The adjustment member 26 has, in one end portion, a connection portion 39 which is screwed together with the external thread portion 38 of the spoke 12, and, in the other end portion, a head portion 35 which engages with the holder portion 13, the head portion 35 provided with a socket portion 35A into which a tool such as an Allen wrench can be inserted. Thus, it is possible to perform tension adjustment of the spoke 12 by screwing the adjustment member 26 to the spoke 12 or loosening.

In this embodiment, the rim 14 is an aluminum extruded material, and the hollow portions 33, 33, are provided to the flanges 34, 34 for weight reduction.

In other words, in the tubeless-tire wheel 10, the external thread portion 28 is formed in the end portion 38 of the spoke 12 on the rim side, the internal thread portion 21 into which this external thread portion 28 can be screwed is formed in the rim, and the one end 15 of the spoke is connected to the rim 14 by screwing the external thread portion 28 into the internal thread portion 21.

Specifically, the rim 14 is characterized in that the rim 14 includes the bottom portion 29; the inclined portions 25, 25 obliquely extended from the bottom portion 29; and the base portions 31, 31 flatly, outwardly extended from outer edges 25s, 25s of these inclined portions 25, 25, and that the internal thread portion 21 is formed in the inclined portion 25.

It should be noted that the internal thread portion 21 is formed in a state where the rim 14 is not penetrated.

The internal thread portion 21 may be formed in any of the bottom portion 29, the inclined portion 25, and the base portion 31 of the rim 14. Among them, while the bottom portion 29 and the base portion 31 are substantially orthogonal to the spoke 12, it is possible to make the inclined portion 25 be in line with the spoke 12. If the internal thread portion 21 is formed in such an inclined portion 25, it is possible to form the internal thread portion 22 with a sufficient length, and it is not necessary to increase the thickness of the inclined portion 25 so much.

In other words, it is possible to form a sufficient length of screw hole in the inclined portion 25 which has relatively thin thickness. Thus, it is possible to achieve reduction in the weight of the rim 14.

The rim includes the bottom portion 29, the inclined portion 25 obliquely extended from the bottom portion 29, and the base portions 31, 31 flatly, outwardly extended from the outer edges of these inclined portions 25, 25. The internal thread portion 21 is formed in the inclined portion 25 which is provided between the bottom portion 29 and the base portion 31 and also serves as a strengthening part.

Since the internal thread portion 21 is exclusively provided to the inclined portion 25 which also serves as a strengthening part, the force exerted from the spoke 12 is wholly received by the inclined portion, and thus not received by the bottom portion 29 nor the base portion 31.

Since there is no need for the force exerted from the spoke 12 to be received by the bottom portion 29 and the base portion 31, it is possible to make the thicknesses of the bottom portion 29 and the base portion 31 thinner than that of the inclined portion 25.

As a result, making the thicknesses of the bottom portion 29 and the base portion 31 thin effectuates an advantage that reduction in the weight of the rim 14 can be achieved.

Since the fixation portion on the rim side is the internal thread portion 21, and the one end of the spoke 12 is connected to the rim 14 by screwing the external thread portion 28 into the internal thread portion 21, generally, a plurality of through holes which would otherwise be made by the number of spokes 12 for fixing the spoke 12 in the rim will be unnecessary, and the internal thread portion 21 can be completed with a blind hole.

Since the internal thread portion 21 can be completed with a blind hole, it is possible to eliminate a through hole made in the rim.

The elimination of the through hole significantly increases the stiffness of the rim 14.

Since the increase in the rim stiffness allows for easily obtaining certain stiffness, it is possible to make the thickness of the rim 14 thinner than that of the conventional one. As a result, it is made possible to achieve reduction in the weight of the rim 14.

In addition, the spoke 12 is inclined parallel to the inclined portion 25.

Since the spoke 12 is inclined parallel to the inclined portion 25, it is possible to make the internal thread for fastening the spoke 12 by use of the thickness of the inclined portion 25.

If the inclination of the inclined portion 25 and the inclination of the spoke 12 coincide with each other, it is possible to further reduce the thickness of the inclined portion 25, and thus it is possible to achieve further reduction in the weight of the rim 14.

In addition, since the rim 14 is so configured that the rim 14 receives force from the spoke 12 in the direction of the inclination angle of the rim 14, it is possible to ensure stiffness effectively while the increase in the thickness of the rim 14 is inhibited.

As a result, it is made possible to increase the stiffness of the rim 14, and it is possible to ensure the connection stiffness between the rim 14 and the spoke 12.

Moreover, the thickness of the inclined portion 25 is set thicker than those of the adjacent bottom portion 29 and base portion 31.

Since the thickness of the inclined portion 25 is thicker than those of the bottom portion 29 and the base portion 31, it is possible to inhibit the local deformation of the inclined portion 25 which is the part on which force is exerted. At the same time, since it is possible to make the adjacent bottom portion and base portion 31 thin, it is possible to achieve reduction in the weight of the rim 14.

By making the inclined portion 25 thick, it is possible to tap a thread of a larger size as needed.

In the inclined portion 25, a part to which the internal thread portion 21 is provided is made thick, and the other part is set thin to the extent that the thickness thereof is substantially equal to those of the bottom portion 29 and the base portion 31.

If the inclined portion 25 were made evenly thick, the weight of the rim 14 would increase. Accordingly, the needed portion (part to which the internal thread portion is provided) in the inclined portion 25 is expanded inward or outward to be made thick, and the other part thereof is made thin to the extent that the thickness thereof is substantially equal to those of the bottom portion 29 and the base portion 31, thereby reducing the unnecessary thickness, and achieving reduction in the weight of the rim 14.

Alternatively, as shown by the imaginary line in FIG. 3, by removing what is called a pad portion, which is other part than that to which the internal thread portion is provided, by removal machining such as cutting to effect formation of the cross section as shown by the solid line, it is made possible to achieve reduction in thickness.

In addition, by casting or forging the rim to form the inclined portion 25, to which the internal thread portion 27 is not provided, with a thin thickness, it is also made possible to omit a cutting process.

As described above, the external thread portion 28 is formed in the end portion of the spoke 12 on the rim side, the internal thread portion 21 into which this external thread portion 28 can be screwed is formed in the rim, and the one end of the spoke 12 is connected to the rim 14 by screwing the external thread portion 28 into the internal thread portion 21.

When the internal thread portion 21 into which the external thread portion 28 can be screwed is made as a blind hole as described in the embodiment, there is no need to be afraid of air leak from the tire, and it is possible to provide the internal thread portion 21 to an arbitrary position in the rim 14. As a result, it is made possible to increase the degree of flexibility in the design for the attachment position of the spoke 12. Alternatively, with selection of position, the internal thread portion 28 may be made as a through hole.

An inner circumference 32c of the tire 32 abuts against the base portion 31, and the extension C of the spoke 12 is disposed along an inner circumference 32d of the tire side portion 32a. Thus, there is no need to arrange the spoke 12 unnecessarily widely, so that a compact structure can be realized, and the load exerted from the spoke 12 can be effectively received by the tire 32 which runs along the extension of the axis of the spoke 12.

Figure 4:
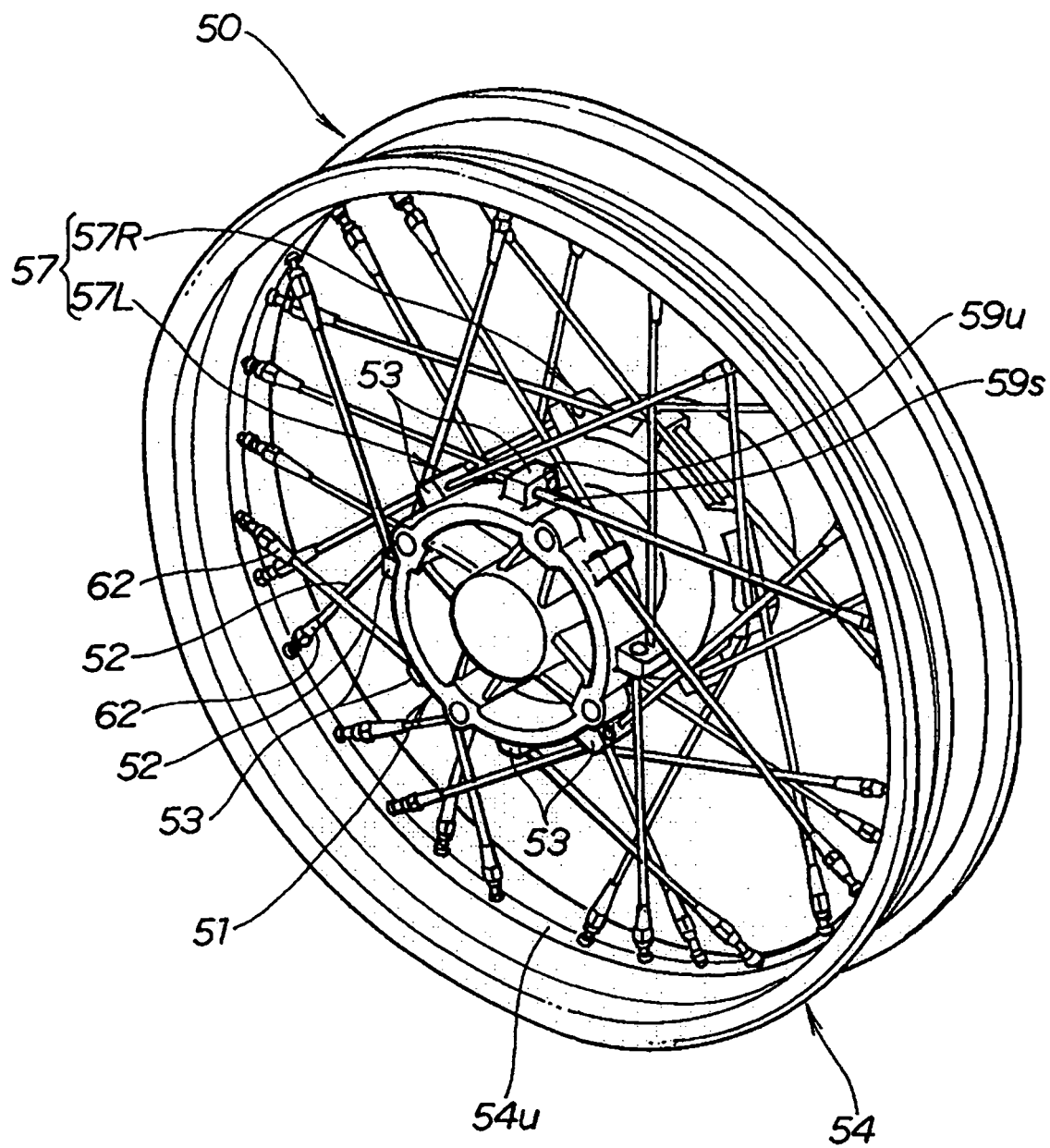
FIG. 4 is a perspective view of a tubeless-tire wheel according to a second embodiment.

FIG. 4 is a perspective view of a tubeless-tire wheel according to a second embodiment. The tubeless-tire wheel 50 is one in which a plurality of holder portions 53 . . . for attaching spokes 52 . . . around a hub 51 which is the center of a wheel are provided, and the spokes 52 . . . are extended from these holder portions 53 . . . to an inner circumference 54u of a circular-wheel-shaped rim 54, and are attached to the inner circumference 54u of the rim 54.

The holder portions 53 . . . have two rows of holders 57 in the axis direction of the hub 51. The rows of holders 57 consist of a left side row 57L and a right side row 57R. Moreover, one row of holders includes eight holder portions 53 . . . .

The holder portions 53 . . . includes two hole portions 59s and 59u constituted of the outer ones and the inner ones, respectively.

In addition, a connection member 62 for adjusting tension of the spoke 52 is interposed at a position in the spoke 52 to the rim 54 side. The detail is explained in FIGS. 5 and 6.

Figure 5:
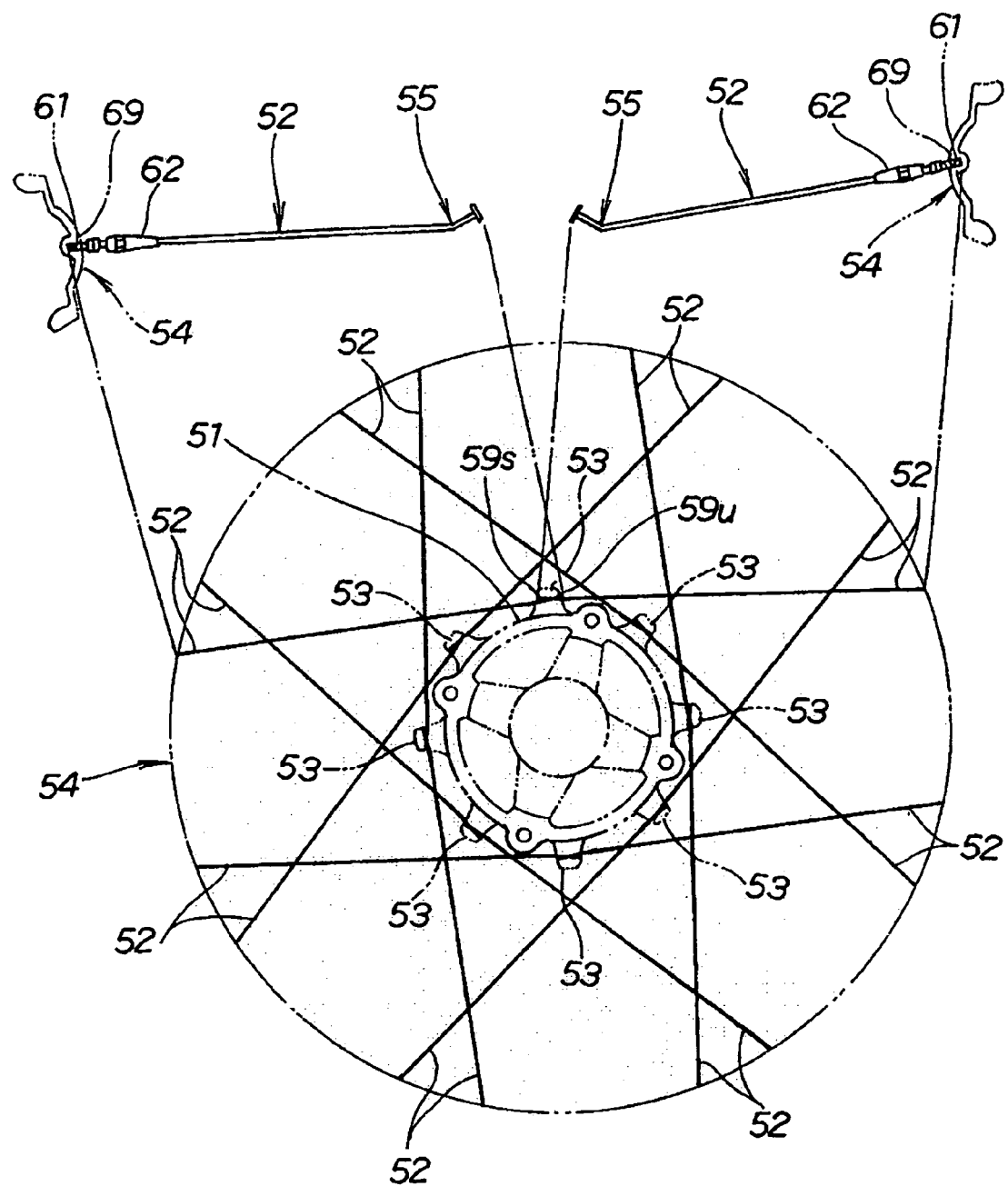
FIG. 5 is a diagram for explaining a state of spokes attached to the wheel according to the second embodiment.

FIG. 5 is a diagram for explaining a state of the spokes attached to the wheel according to the second embodiment, and shows the relative arrangement of the spokes 52 . . . .

As attachment portions of the spokes 52 . . . , there are the hole portions 59 . . . which the holder portions 53 . . . constituting the left side row 57L in the hub 51 have, and an internal thread portion 61 made in the rim 54. Moreover, the spoke 52 is extended from the hole portion 59 of the holder portion 53 to the rim 54, and attached thereto.

In FIG. 5, shown is the arrangement of the spoke 52 extended from the holder portions 53 . . . of the left side row 57L out of two rows of holders 57L and 57R included in the hub 51. The spokes extended from the right side row 57R are the same as those extended from the left side row 57L with the exception that the spokes extended from the right side row 57R are arranged with a some phase difference between 1° and 15° given thereto with respect to the spokes of the left side row 17L, and therefore will be omitted.

Next, by taking as an example one holder portion 53 out of the holder portions 53 . . . arranged in the left side row 57L, a description concerning attachment relation at the start and end points of the two spokes 52, 52 extended from the holder portion 53 will be given.

The upper left part of FIG. 5 is a diagram showing that the spoke 52 is extended from the inner hole 59u out of the two holes included in the holder portion 53 to a bottom portion 69 provided to the substantially middle portion of the rim 54, and attached thereto.

On the other hand, the upper right part of FIG. 5 is a diagram showing that the spoke 52 is extended from the outer hole 59s in the holder portion 53 to the bottom portion 69 provided to the substantially middle portion of the rim 54, and attached thereto.

Thus, in the present embodiment, each spoke 52, which protrudes from the holder portion 53 included in the left side row 57L, is extended to the bottom portion 69 provided to the substantially middle portion of the rim 54, and attached thereto.

Similarly, each spoke 52, which protrudes from the holder portion 53 included in the right side row 57R (not shown), is extended to the bottom portion 69 provided to the substantially middle portion of the rim 54, and attached thereto.

Since the connection members 62 . . . are interposed at positions to the rim 54 side for adjusting tension of the spokes 52 . . . , each engagement portion of the spokes 52 . . . attached to the holder portion 53 can be made more simple and lightweight. Specifically, it is possible to omit the adjustment member 26 (see FIG. 3) having the thread portion which is shown in the first embodiment.

Figure 6:
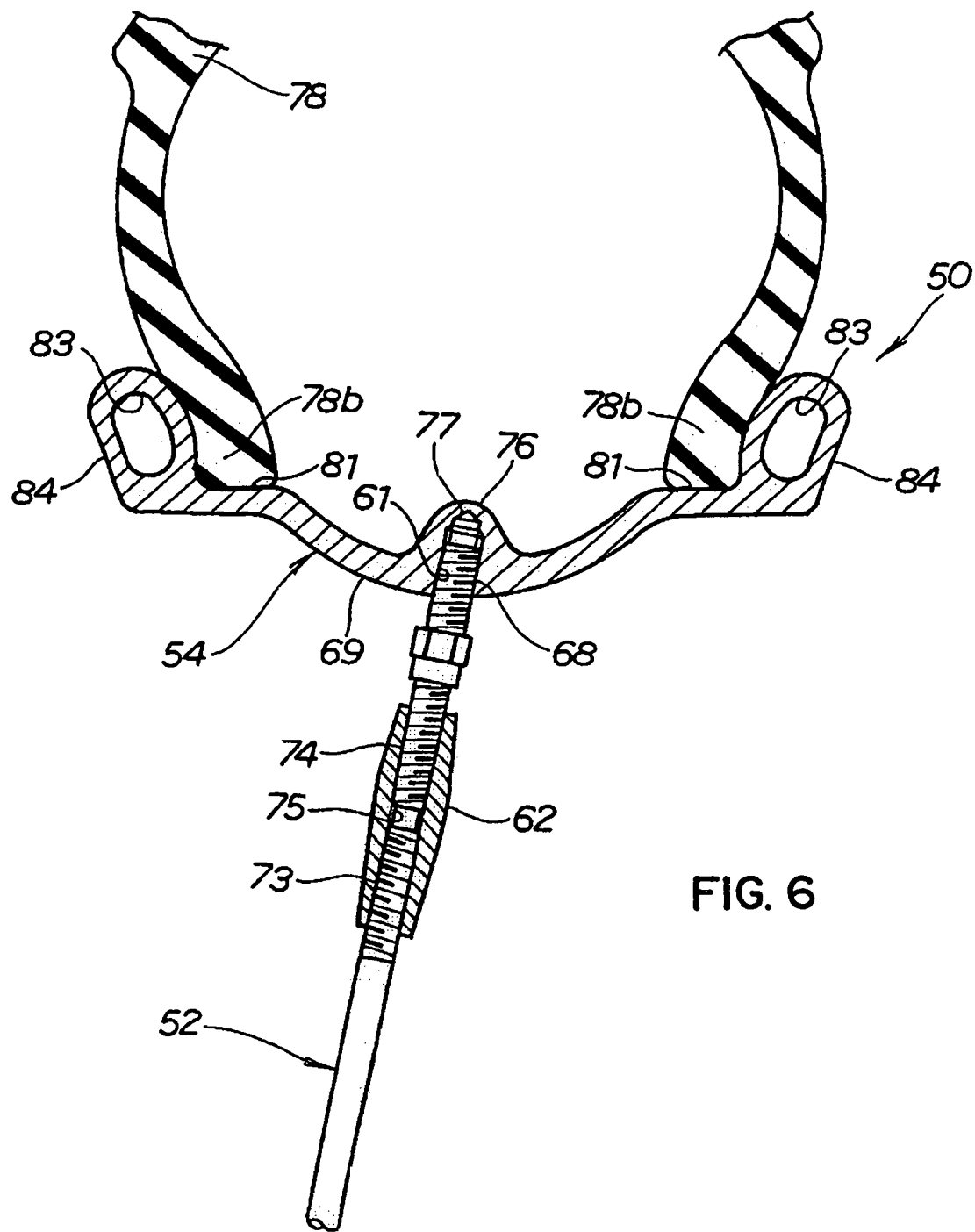
FIG. 6 is a main-part cross section of FIG. 5.

FIG. 6 is a main-part cross section of FIG. 5, showing the attachment structure of the spoke 52 to the rim.

The spoke 52 is a member which connects the hub 51 and the rim 54 in such a way that a protruding portion 76 protruding in the direction away from the hub 51 (see FIG. 5) is provided to the bottom portion 69 of the rim 54, and an external thread portion 68 of the spoke 52 is screwed into the internal thread portion 61 provided to the protruding portion 76.

Significantly different features from the first embodiment are that each spoke 52 is extended to the bottom portion 69 provided to the substantially middle portion of the rim 54 and attached thereto, and that the connection member 62 for adjusting the tension of the spoke 52 is provided to the spoke 52 to the rim side. Reference numeral 73 indicates a first connection thread portion, 74 indicates a second connection thread portion, and 75 indicates an internal thread portion. It should be noted that a bend portion 55 is provided to the spoke 52 to the holder portion 53 side (see FIG. 5) in order to prevent the connection member 62 from rotating together at the time of adjustment.

Specifically, the rim 54 includes the bottom portion 69 in the middle thereof in the width direction of the cross section, the protruding portion 76 protruding in the direction away from the hub 51 (see FIG. 5) is provided to the bottom portion 69, and the internal thread portion 61 is formed in the protruding portion 76.

It is made possible to dispose the heavy portion at the rotation center because the rim 54 includes the bottom portion 69 in the middle thereof in the width direction of the cross section, the protruding portion 76 protruding in the direction away from the hub 51 is provided to the bottom portion 69, and the internal thread portion 61 is formed in the protruding portion 76. As a result, the cornering ability of the wheel 50 can be improved.

In addition, the internal thread portion 61 provided to the rim 54 is provided to the bottom portion 69, which internal thread portion 61 is made as a blind hole. That is, while the internal thread portion 61 is formed to the center side of a base portion 81 of the rim supporting a bead portion 78b of a tubeless tire 78, one end 77 is made blind, so that the spoke 52 can be arranged without consideration of air leak. As a result, the degree of flexibility in the arrangement of the spoke 52 can be increased.

In this embodiment, with regard to the position of the connection member 62, while the connection member 62 is disposed near the rim 54, it is possible to dispose the connection member 62 at an arbitrary position in the spoke 52. Preferably, the connection member 62 is disposed near to the hub 51 (see FIG. 5), so that the moment of inertia is reduced.

Incidentally, 83 indicates a hollow portion which is provided in order to reduce weight and to increase stiffness, and 84 indicates a flange.

Back to FIG. 4, by use of the connection member 62, the structure of the engagement portion of the holder portion 53, which engagement portion is one end of the spoke 52, can be made simple and lightweight compared to that of the first embodiment shown in FIG. 1. That is, in FIG. 3, the adjustment member 26 can be omitted.

Figure 7:
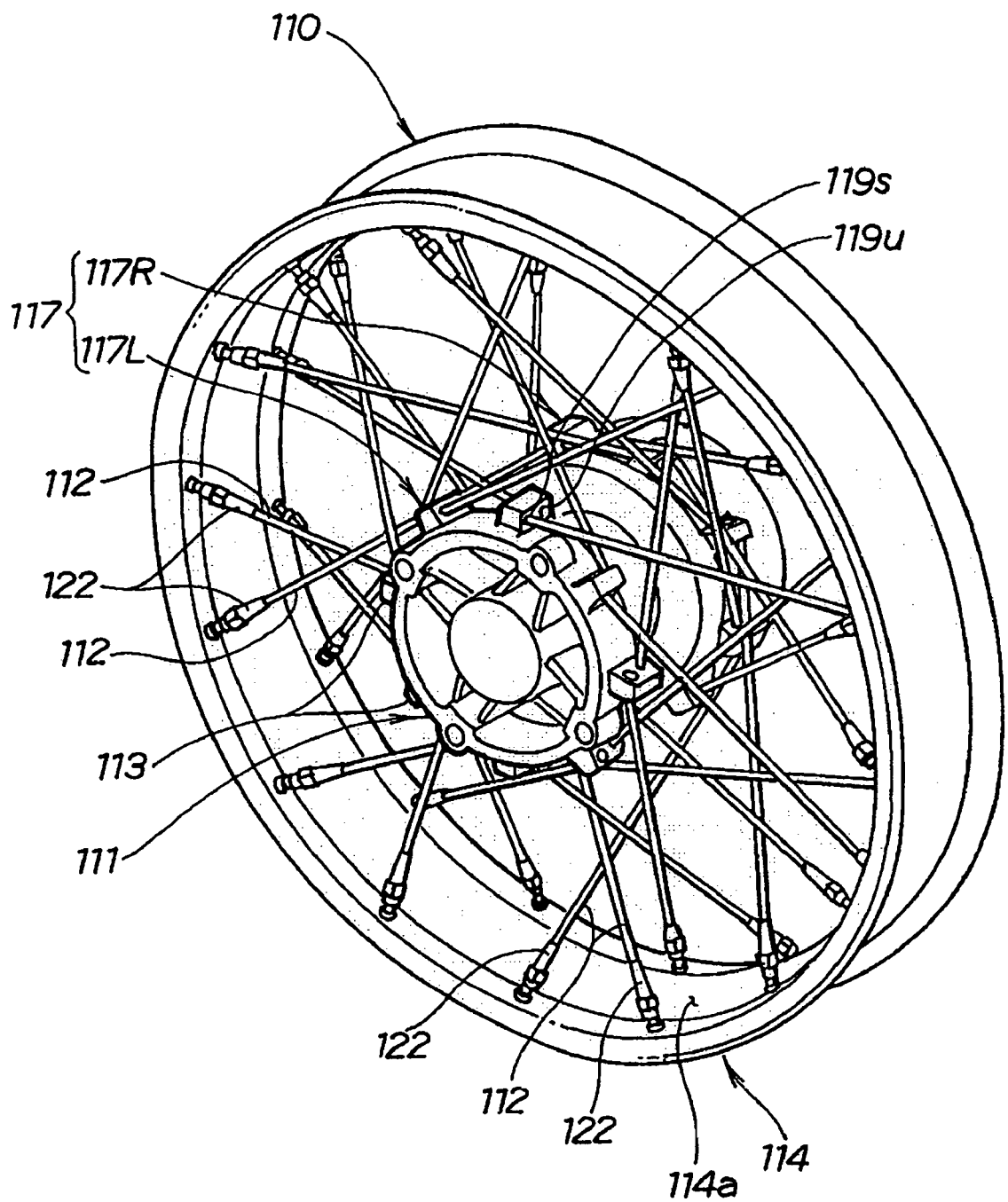
FIG. 7 is a perspective view of a tubeless-tire wheel according to a third embodiment.

FIG. 7 is a perspective view of a tubeless-tire wheel according to a third embodiment. The tubeless-tire wheel 110 is one in which a plurality of holder portions 113 . . . each of which is for attaching a spoke 112 around a hub 111 which is the center of a wheel are provided, and the plurality of spokes 112 . . . are extended from these holder portions 113 . . . toward an inner circumference 114a of a circular-wheel-shaped rim 114, and are attached to the inner circumference 114a of the rim 114.

The holder portions 113 . . . have two rows of holders 117 in the axis direction of the hub 111. The rows of holders 117 consist of a left side row 117L and a right side row 117R. Moreover, the holder portions 113 . . . constituting the rows of holders 117 include two hole portions 119s . . . and 119u . . . constituted of the outer ones and the inner ones, respectively.

In addition, connection members 122 . . . are interposed at midpoints of the spokes 112 . . . to the rim 114 side.

Figure 8:
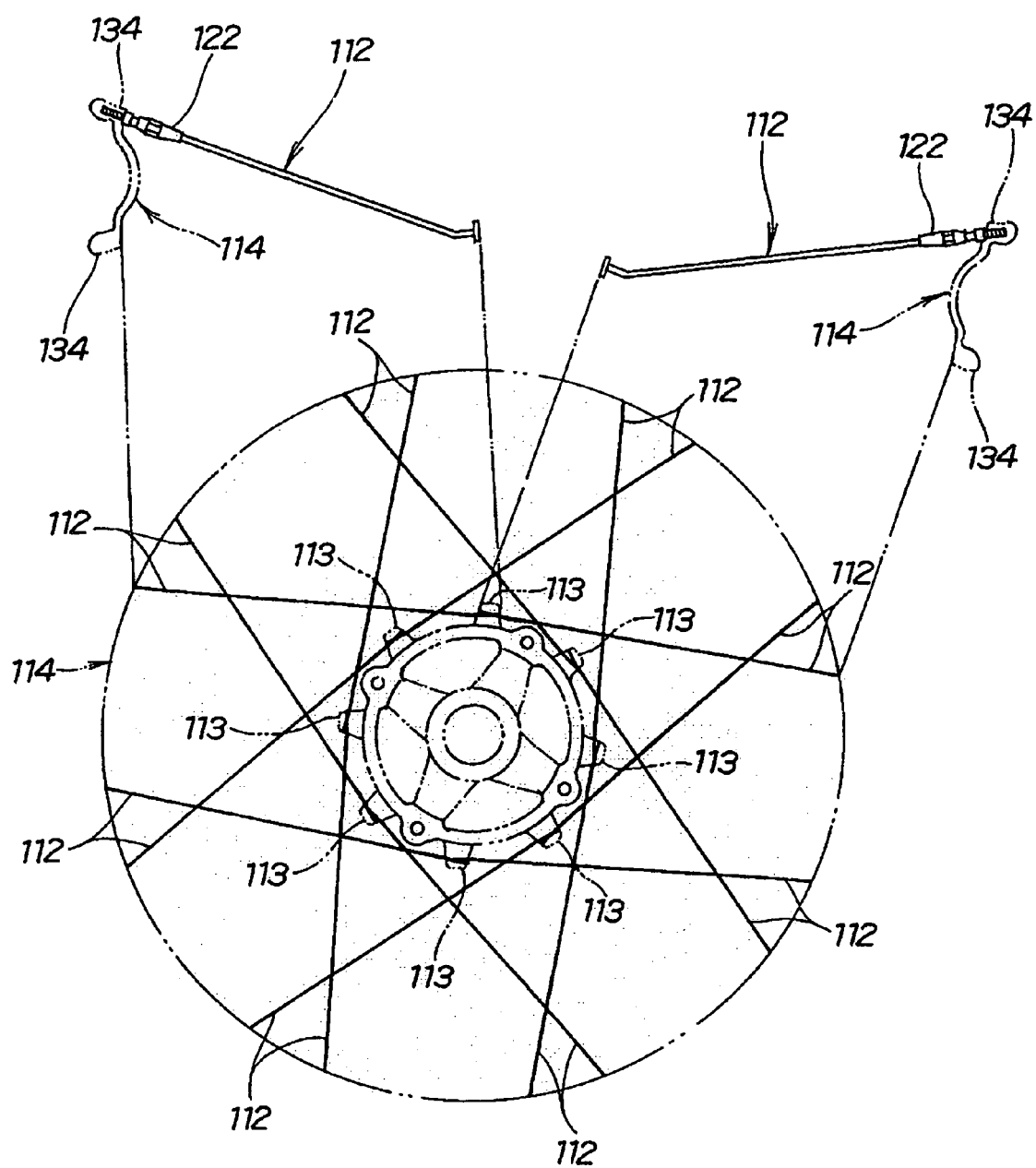
FIG. 8 is a diagram for explaining a state of spokes attached to the wheel according to the third embodiment.

FIG. 8 is a diagram for explaining a state of the spokes attached to the wheel according to the third embodiment, and shows the relative arrangement of the spokes.

Significantly different features from the first embodiment of FIG. 2 are that each spoke 112 is extended to a flange 134 provided to either the left or the right of the rim 114 and attached thereto, and that the connection member 122 is interposed in the spoke 112 to the rim 114 side in order to adjust the tension of the spoke 112.

Figure 9:
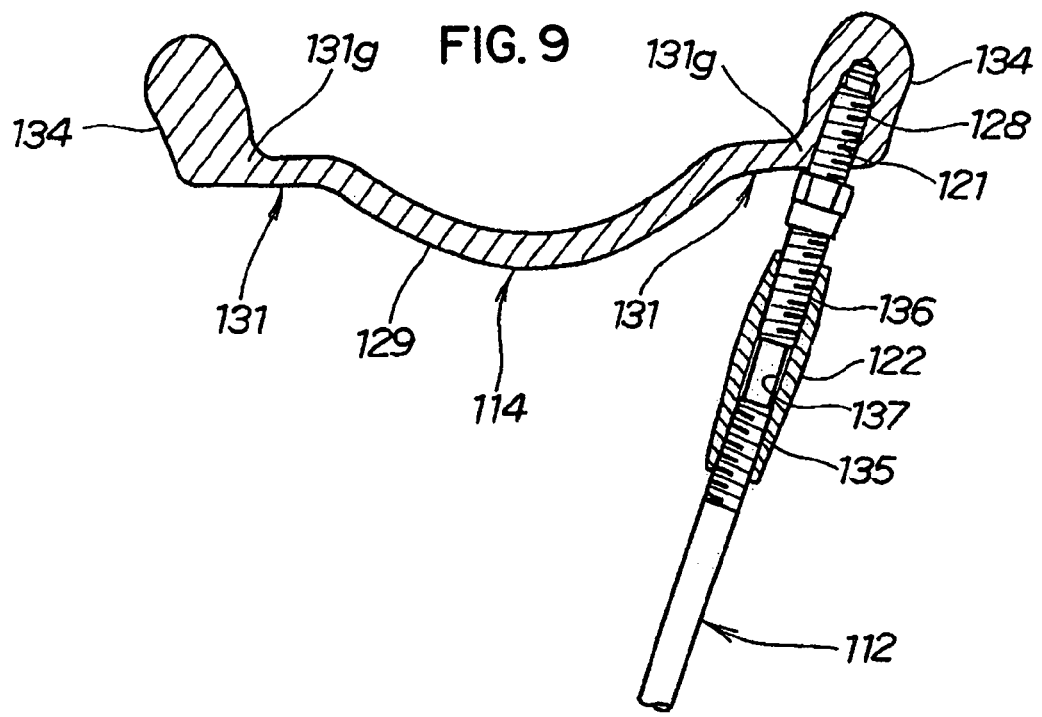
FIG. 9 is a cross section of a wheel portion according to the third embodiment.

FIG. 9 is a cross section of the wheel portion according to the third embodiment, showing the attachment structure of the spoke 112 to the rim.

Significantly different features from the first embodiment are that the spokes 112 . . . are extended to the flange 134 provided to either edge of the rim 114 and attached thereto, and that the connection member 122 for adjusting the tension of the spoke 112 is interposed in the spoke 112 to the rim side. Reference numeral 135 indicates a first connection thread portion, 136 indicates a second connection thread portion, and 137 indicates an internal thread portion.

Specifically, the rim 114 of the tubeless-tire wheel 110 (see FIG. 7) includes a bottom portion 129; a base portion 131 flatly, outwardly extended from this bottom portion 129; and the flange 134 extended from an outer edge 131g of the base portion 131 in the direction away from the hub 111. An internal thread portion 121 is formed in the flange 134.

Since the internal thread portion 121 is formed in the flange 134, and the flange 134 is formed thick in order to fix the spoke 112, it is possible to increase stiffness.

As a result, even when the rim 114 receives impact force from the outside, air leak can be reduced.

Figure 10:
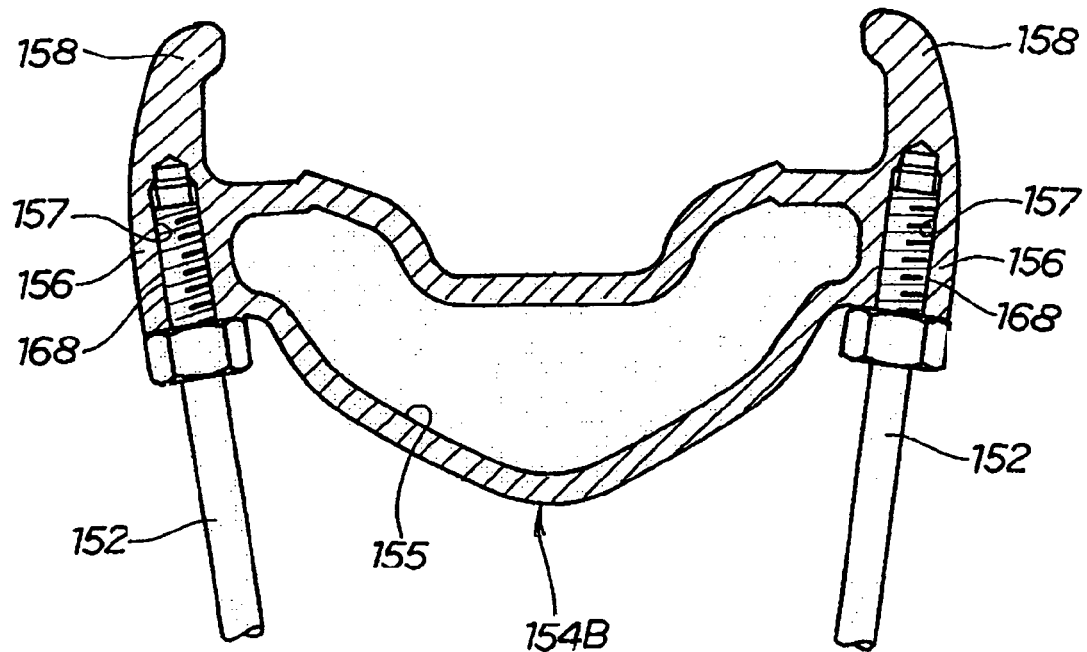
FIG. 10 is a cross section of a wheel portion according to a fourth embodiment.

FIG. 10 is a cross section of a wheel portion according to a fourth embodiment, the embodiment characterized in that a rim 154B is made as a hollow-cross-section structure including a hollow portion 155, and that an internal thread portion 157 is formed in a wall portion 156 surrounding the hollow portion 155. Reference numeral 152 indicates a spoke, and 168 indicates an external thread portion.

Since the rim 154B is made as a hollow-cross-section structure including the hollow portion 155, and the internal thread portions 157, 157 are formed in the wall portions 156, 156 surrounding the hollow portion 155, it is possible to reduce the weight of the rim 154B. Moreover, by forming the internal thread portions 157, 157 in the wall portions 156, 156 surrounding the hollow portion 155, and devising the cross sectional shape of the hollow portion 155, it is made possible to easily increase the section modulus, and to achieve increase in the stiffness of the wheel. As a result, it is made possible to achieve both of the reduction in the weight and the increase in the stiffness of the wheel 110 (see FIG. 7).

Incidentally, reference numeral 158 indicates an extension portion covering the bead portion of the tire from the outside in the axle direction, and the extension portion 158 is disposed substantially collinearly with the wall portion 156.

Figure 11:
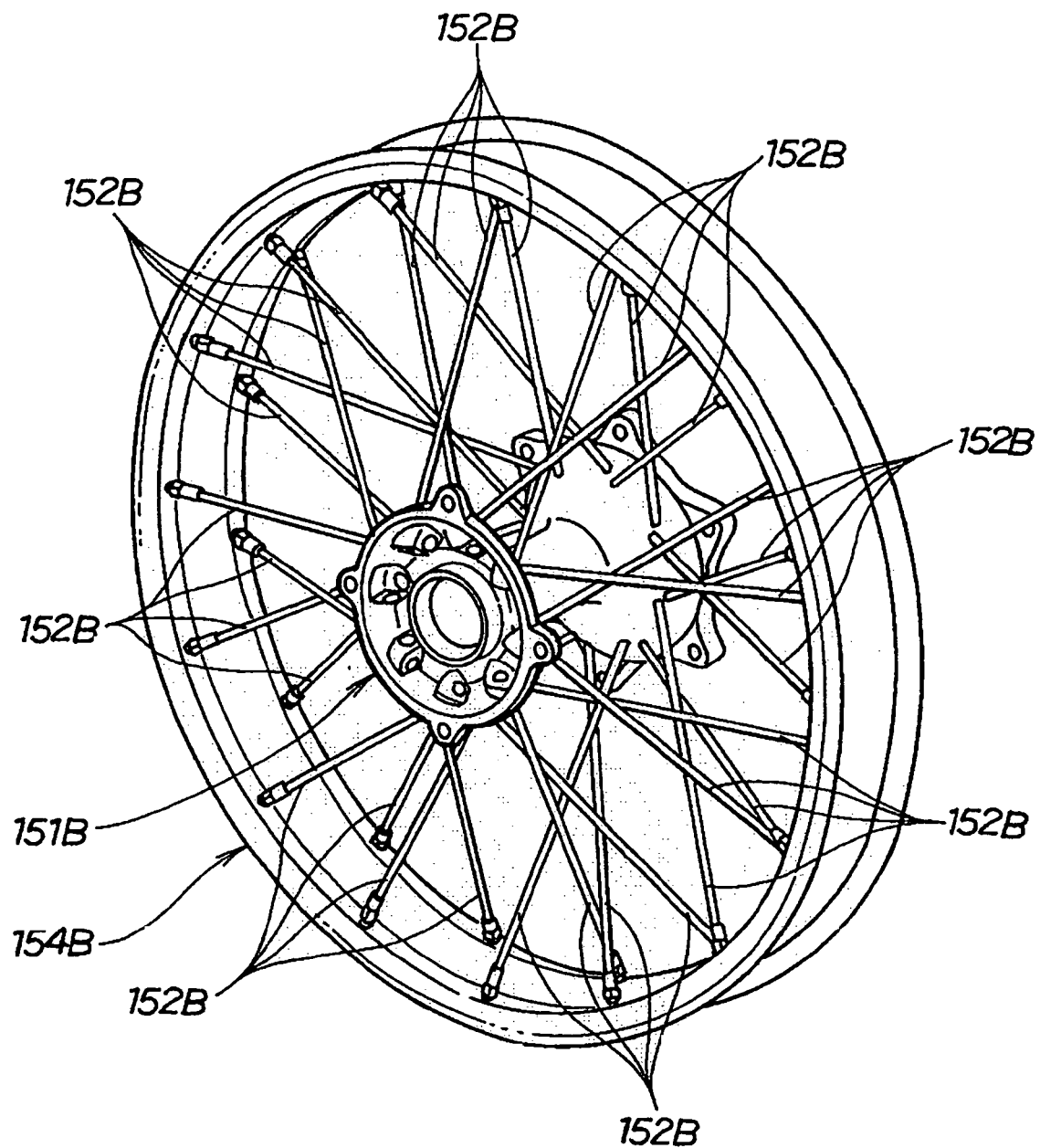
FIG. 11 is a perspective view of a tubeless-tire wheel according to a fifth embodiment.

FIG. 11 is a perspective view of a tubeless-tire wheel according to a fifth embodiment. With regard to the arrangement of spokes 152B . . . extended from a hub 151B to a rim 154B and attached thereto, it is shown that the spokes 152B are stretched in the substantially radial direction of the rim 154B. Since the spokes 152B are stretched in the substantially radial direction of the rim 154B, it is possible to increase the strength of the whole wheel.

It should be noted that the internal thread portion formed in the rim does not have to be formed in the inclined portion. That is, the position at which the internal thread portion formed in the rim is disposed can be freely chosen.

Also, the inclined portion provided to the rim does not have to be inclined parallel to the spoke. That is, the inclination angle of the inclined portion can be freely chosen.

The thickness of the inclined portion may be formed thinner than those of the adjacent bottom portion and base portion. That is, the thickness of the inclined portion can be freely chosen.

In addition, while the present invention is applied to a two-wheeled vehicle such as a motorcycle and a bicycle in the embodiments, the present invention may be applied to general vehicles.

Moreover, the present structure may be used for a tube tire. The present structure is effective in being able to eliminate nipples.

Although embodiments of the present invention have been described thus far, the present invention is not limited to the examples in the drawings and the embodiments described above, and various modification may be made without departing the scope of the present invention, as a matter of course.

We claim:

1. A tubeless-tire wheel which includes a hub attached to an axle, a rim to which a tubeless tire is fitted, and a plurality of spokes connecting the rim to the hub, the tubeless-tire wheel, comprising:

external threaded portions formed at end portions of the spokes on the rim side of the spokes, blind holes formed in the rim with internal threaded portions into which the external threaded portions of the spokes can be screwed, and one end of each of the spokes connected to the rim with at least portions of the external threaded portions threaded in the internal threaded portions, wherein the rim includes a bottom portion, inclined portions obliquely extending from the bottom portion toward a nearest portion of the tire, and base portions extending flatly outwardly from outer edges of the inclined portions, said internal threaded portions being formed into the inclined portions, wherein the spokes are inclined parallel to the internal threaded portions, wherein the inclined portions have a thickness which is greater than a thickness of adjacent said bottom portions and said base portion, wherein said inclined portions have first portions in which the internal threaded portions are provided and second portions which are free of said internal threaded portions, said second portions having a thickness substantially equal to a thickness of said bottom portion and said base portions, said first portions being thicker than said second portions.

2. The tubeless-tire wheel according to claim 1, wherein said tire has an inner circumference, the inner circumference being in contact with the base portions, the spokes being disposed to extend along side portions of the tire.

3. The tubeless-tire wheel according to claim 1, wherein holder portions are formed in said hub, said holder portions being non-threaded, and adjustment members are provided for said spokes, each of said adjustment members being adjustably attached to one of said spokes, each of said adjustment members fitting in one of said non-threaded, holder portions.

4. The tubeless-tire wheel according to claim 3, wherein each of the adjustment members includes a head portion filling into the non-threaded, holder portion and a socket portion used to screw the adjustment member relative to the spoke.

5. A tubeless-tire wheel which includes a hub attached to an axle, a rim to which a tubeless tire is fitted, and a spoke connecting the rim to the hub, the tubeless-tire wheel, comprising:

an external threaded portion formed at an end portion of the spoke on the rim side of the spoke, a blind hole formed in the rim with an internal threaded portion into which the external threaded portion of the spoke can be screwed, and one end of the spoke connected to the rim with at least a portion of the external threaded portion threaded in the internal threaded portion, wherein the rim includes base portions and a bottom portion connecting thereto in the middle between the base portions of a cross-section of said rim, said base portions supporting bead portions of the tubeless tire, said rim further including a protruding portion protruding from the bottom portion in a direction away from the hub, said internal threaded portion being formed in the protruding portion, wherein the spoke is threaded into the internal threaded portion of the blind hole in the protruding portion without consideration of air leakage.

6. A tubeless-tire wheel which includes a hub attached to an axle, a rim to which a tubeless tire is fitted, and a plurality of spokes connecting the rim to the hub, the tubeless-tire wheel, comprising:

external threaded portions formed at end portions of the spokes on the rim side of the spokes, blind holes formed in the rim with internal threaded portions into which the external threaded portions of the spokes can be screwed, and one end of each of the spokes connected to the rim with at least portions of the external threaded portions threaded in the internal threaded portions, wherein the rim includes a bottom portion, inclined portions obliquely extending from the bottom portion, base portions extending flatly outwardly from outer edges of the inclined portions, and flanges extending from outer edges of the base portions in directions away from the hub, said flanges holding the tubeless tire, said internal threaded portions being formed in the flanges.

7. A tubeless-tire wheel which includes a hub attached to an axle, a rim to which a tubeless tire is fitted, and a plurality of spokes connecting the rim to the hub, the tubeless-tire wheel, comprising:

external threaded portions formed at end portions of the spokes on the rim side of the spokes, blind holes formed in the rim with internal threaded portions into which the external threaded portions of the spokes can be screwed, and one end of each of the spokes connected to the rim with at least portions of the external threaded portions threaded in the internal threaded portions, wherein the rim includes a bottom portion, inclined portions obliquely extending from the bottom portion toward a nearest portion of the tire, and base portions extending flatly outwardly from outer edges of the inclined portions, wherein the rim is formed to have a hollow portion beneath the bottom portion, inclined portions, and base portions, said internal threaded portions being formed in wall portions surrounding the hollow portion thereby avoiding puncturing the hollow portion, wherein the spokes are inclined parallel to the internal threaded portions.

* * * * *